March 7, 1939.  F. E. SMITH  2,149,555
LOW-PRESSURE ALARM FOR TIRES
Filed Oct. 21, 1936
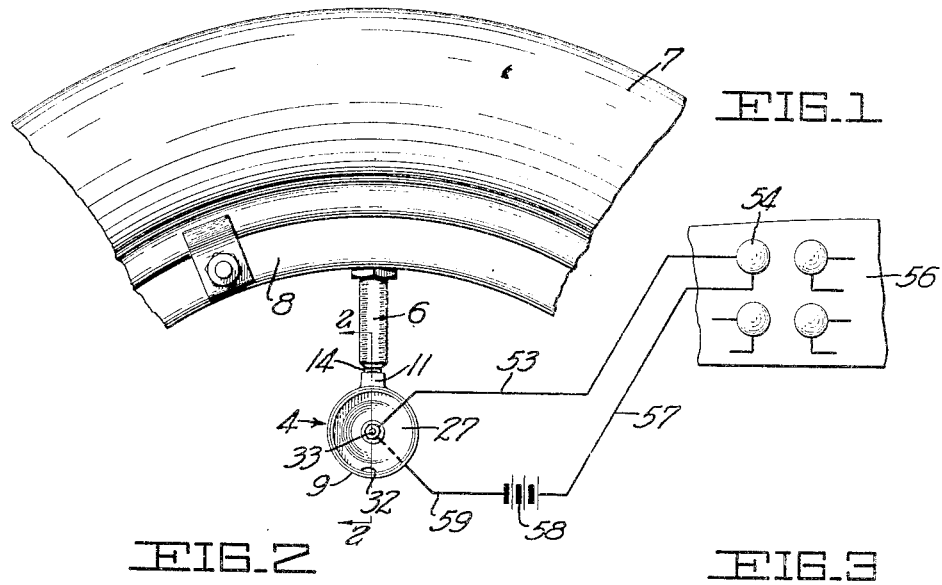
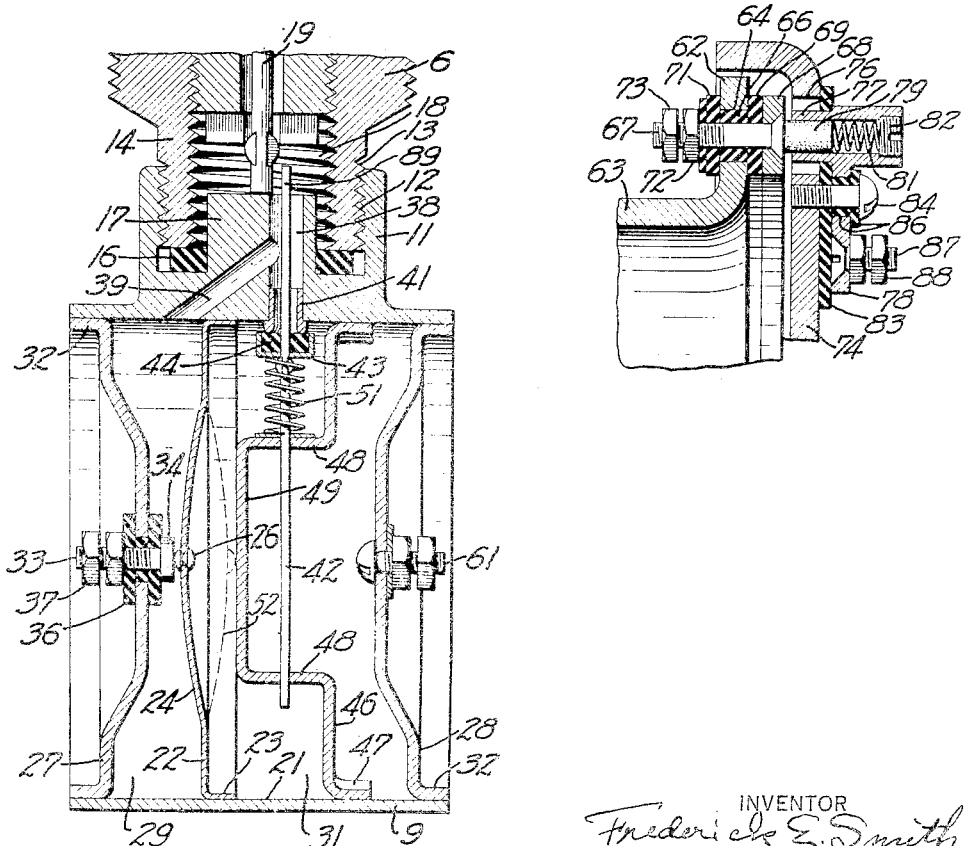
INVENTOR
Frederick E. Smith
BY
Harry C. Schroeder
ATTORNEY Patented Mar. 7, 1939

2,149,555

UNITED STATES PATENT OFFICE 2,149,555

LOW-PRESSURE ALARM FOR TIRES

Frederick E. Smith, San Leandro, Calif.

Application October 21, 1936, Serial No. 106,724

3 Claims. (Cl. 200—58)

This invention relates to mechanism for indicating the existence, in pneumatic devices, of pressures at or below a predetermined minimum, and particularly to such a mechanism used in conjunction with a pneumatic vehicle tire to inform the operator of the vehicle when the tire has reached a dangerous degree of deflation.

It is an object of the invention to provide mechanism of the character described in which the force required to trip the alarm, to indicate minimum pressure, is supplied by a portion of the air maintained at the original maximum pressure.

Another object of the invention is to provide, in a device of the character described, an alarm controlling member which is actuated entirely by air pressure without the use of separate springs.

A further object of the invention is to provide a low-pressure alarm mechanism which may be attached directly to existing tire stems without, in any way, altering the stem or the valve mechanism thereof.

Still another object of the invention is to provide a simple foolproof, and efficiently operating, pneumatically actuated electric switch.

The invention possesses other objects and features of value, some of which, together with the foregoing, will be specifically set forth in the detailed description of the preferred form of the invention hereunto annexed. It is to be understood that the invention is not to be limited to the specific form thereof shown and described as various other embodiments thereof may be employed within the scope of the appended claims.

Referring to the drawing:

Figure 1 is a fragmental front elevational view of a portion of a vehicle wheel showing the alarm switch of my invention mounted thereon, and illustrating diagrammatically, the electrical connections between the alarm and the signal lights.

Figure 2 is a vertical sectional view, to an enlarged scale, of the alarm switch. The plane of section is indicated by the line 2—2 of Figure 1.

Figure 3 is a fragmental vertical sectional view of portions of the brake drum and cover therefor showing the structure for conducting the electric current from the alarm switch to the signal lights.

The low-pressure alarm mechanism of my invention may be used in conjunction with any device in which fluid under pressure is used although I prefer to illustrate and describe the apparatus in use to indicate under-inflation of pneumatic vehicle tires. In Figure 1 the alarm switch, generally indicated by the numeral 4 is mounted on the valve stem 6 of the tire 7 which is carried by the wheel 8. The switch, reference being now had to Figure 2, consists of a body comprising a tubular housing 9 provided with a hub 11 formed integrally therewith and extending radially therefrom. The hub is centrally bored and provided with screw threads 12 which engage the threads 13 of the reduced neck portion 14 of the valve stem 6 and a gasket 16 is disposed between the bottom of the hub bore and the end of the stem portion 14 to provide an airtight joint. A boss 17 rises from the bottom of the hub bore and projects upwardly into the bore 18 of the valve stem, the function of this boss being, when the alarm switch is screwed on the valve stem, to engage and depress the valve rod 19 and maintain the tire valve open.

Disposed in the bore 21 of the housing 9, at a point intermediate the ends of the latter, is a diaphragm 22 provided with a peripheral flange 23, which is welded, or otherwise tightly secured, to the inner surface of the housing, and with a spherically shaped, embossed, central portion 24 in the center of which is secured a rivet 26. The opposite ends of the housing are closed respectively by plates 27 and 28 so as to provide, on each side of the diaphragm, closed chambers 29 and 31, and each plate is provided with a peripheral flange 32 which is secured to the housing in the same manner as the flange 23 of the diaphragm. The plate 27 is provided with a central aperture through which passes a screw 33 provided with a head 34 disposed within the chamber 29 and insulating washers 36, which are clamped together upon the plate by the nuts 37 of the screw serve both to electrically isolate the screw from the plate and render the aperture, through which the screw passes, airtight.

The boss 17 is provided with a passage 38 which leads from the bore 18 of the valve stem into the chamber 31, and with a diagonal passage 39 which communicates with the passage 38 and with the chamber 29. It will be seen therefore that air from the tire will enter both of the chambers 29 and 31 through the passages 39 and 38 respectively. The end of the passage 38, where it enters the chamber 31, is provided with a bushing 41 through which passes a valve rod 42 carrying a cup 43 in which is held a rubber washer 44. A bracket 46, whose flanges 47 are welded to the housing, is provided with horizontally bent portions 48 each being apertured to slidably receive the valve rod 42, so as to provide a guide therefor, and an offset portion 49 of the bracket, joining the portions 48, is disposed adjacent the face of the diaphragm 22. A coil spring 51 is disposed between the upper horizontal portion 48 of the bracket and the cup 43 so as to resiliently maintain the washer 44 in contact with the bushing 41 thereby closing the lower end of the passage 38.

In operation the tire of the vehicle is inflated to the desired pressure in the usual manner after which the alarm switch is screwed on to the stem thereof as shown in Figures 1 and 2. During this operation, as the valve rod 19 is depressed, air will flow from the tire through the passage 39 into the chamber 29 and through the passage 38 into the chamber 31 by forcing the check valve washer 44 from its seat. Due to the fact, however, that the chamber 29 is of lesser volume than the chamber 31, and the air entering the latter must overcome the resistance of the spring 51, the former will reach maximum pressure before the latter, thereby causing the embossed portion 24 of the diaphragm 22 to snap into the position shown by the dotted line 52 wherein the rivet 26 will rest against the portion 49 of the bracket 46 which portion acts as a stop to prevent further movement of the diaphragm. The pressures in both chambers will eventually reach the same degree so that the diaphragm will be pressure-balanced. It will be noted, however, that the chamber 31, after the pressure therein has reached that of the tire, will be sealed by the check valve washer 44. When, due to a leak in the tire or from any other cause, the pressure of the tire drops to a point where continued operation of the vehicle would cause uneven tread wear or other structural damage to the tire, the pressure in the chamber 29 will decrease correspondingly, thereby unbalancing the diaphragm and causing the higher pressure in the chamber 31, which, it will be remembered, is equal to the pressure to which the tire was originally inflated, to snap the diaphragm to the left, as viewed in Figure 2, until the rivet 26 rests against the head 34 of the screw 33.

Means are provided for causing the movement of the diaphragm to display a visible signal to the operator of the vehicle to inform him that the tire is in need or re-inflation. The screw 33 provides one terminal of an electric circuit comprising a conductor 53 which is connected to one of a plurality of signal lights 54 mounted on the instrument board 56 of the vehicle, another conductor 57 connects the signal lamp preferably with the vehicle battery 58, and still another conductor 59 connects the battery with a terminal provided on the housing 9 as represented by the screw 61 secured to the plate 28. The circuit described above is but one of several which may be employed to connect the switch with the signal lights and is therefore purely illustrative. In another type of circuit, one of the conductors may be dispensed with and the current run through the metal wheel, axle, and chassis of the vehicle. It is sometimes found that this arrangement does not provide a path of sufficiently low resistance to the flow of current in which event a conductor is connected to the terminal 61 and to a portion of the wheel which provides satisfactory conduction of the current.

In the event that either of these circuits is used, means must be provided for conducting the current flowing in the other half of the circuit from the wheel back to the battery and structure for performing this is shown in Figure 3. The peripheral flange 62 of the brake drum 63 is provided with spaced apertures 64 having insulating bushings 66 therein through which pass screws 67 which engage at one end a metallic collector ring 68, between which and the flange 62 is interposed a ring 69 of insulating material. Each screw is provided with an insulating washer 71 and a nut 72 which serves to clamp the rings 68 and 69 and the flange 62 together and one of the screws is made longer than the others and is provided with an additional nut 73 to provide a terminal to receive one of the conductors. The dust cover 74, which is fixed to the axle housing, is provided with an aperture 76 through which projects the tubular extension 77, of a bracket 78, in the bore of which is slidably mounted a brush 79 of carbon or other suitable material. A spring 81, retained in the bore by the threaded plug 82, serves to maintain the brush in contact with the face of the ring 68. The bracket 78 is insulated from the dust cover by a sheet 83 of insulating material and a screw 84, which is insulated from the bracket by washers 86 serves to mount the bracket on the dust cover. A screw 87, fitted with nuts 88, provides a terminal to which one of the conductors may be attached. The structure just described provides for bridging the current across the gap between the relatively rotating brake drum and axle housing.

When the diaphragm 22 of one of the alarm switches snaps from its normal position, in contact with the bracket member 49, to engage the head 34 of the screw 33, current will flow from the battery 58, through the conductor 57, the lamp 54, and the conductor 53, in which conductor the collector ring structure described above is located, back to the screw 33 from whence it returns to the battery either through the chassis of the vehicle or through the conductor 59 which substitutes therefor. The signal lamp will thus be lighted, indicating to the operator of the vehicle, that the tire, which the lamp represents, is dangerously under-inflated and should be promptly attended to.

The proportions and shape of the diaphragm 22 determines the limits of pressures at which it will snap, therefore the size and form of the diaphragm illustrated is approximate as the construction of the latter is well understood by those skilled in the art and consequently there is no need to accurately depict it.

Since the operator may inflate the tire, when the latter requires it, to a lesser pressure than exists in the chamber 31, the valve rod 42 is provided with a portion 89 projecting upwardly beyond the end of the boss 17 by means of which the valve 44 may be manually opened to relieve the pressure in, or exhaust the air from, the chamber 31 so that when the device is replaced on the valve stem the chamber will be recharged with the air, at the different pressure, from the tire. This exhausting of the chamber 31 is also to permit resetting of the diaphragm to its "off" position since this could not be done if there existed in the chamber a pressure equal to or approaching the tire pressure.

The apparatus just described is not intended to be used solely as an alarm actuator for vehicle tires as there are numerous uses to which it may be put in systems using fluid under pressure to indicate sub-normal pressure conditions. Many of these uses will be apparent to those skilled in the art.

I claim:

1. A low pressure alarm comprising a hollow housing, a diaphragm in and dividing said housing into a plurality of chambers, means for admitting air under pressure into each of said chambers, means for resiliently resisting the flow of air into one of said chambers, an electrical contact in one of said chambers, and a portion of said diaphragm pressure-biased to alternately snap into each of said chambers and into engagement with said contact.

2. A low-pressure alarm comprising a hollow housing, a diaphragm in and dividing said housing into a plurality of chambers, a pair of connected ducts communicating respectively with the respective chambers and through which air under pressure may be admitted to said chambers, a valve in one of said chambers and closing one of said ducts against the escape of air from said chamber, an electrical contact in the other of said chambers, said diaphragm having a portion thereof normally protruding into said valved chamber and movable by the force of the air contained in said valved chamber to snap into said first chamber and into engagement with said contact, and means extending from said housing for opening said valve.

3. A low-pressure alarm comprising a tubular housing, a diaphragm mounted in said housing intermediate the ends thereof, covers closing the respective ends of said housing to provide between each cover and the diaphragm a closed chamber, said housing having a pair of connected diverging passages, opening respectively into the respective chambers, through which air under pressure may be admitted into said chambers, an electrical contact carried by one of said covers and positioned within one of said chambers, a portion of said diaphragm movable under the pressure of air in the other of said chambers into engagement with said contact, a bracket in the other of said chambers, said bracket having a pair of alined apertures therein, a rod passing through one of said ducts and slidably engaged in said apertures, a valve member carried by said rod and disposed adjacent the end of said duct where it enters said chamber, and a spring disposed between said valve member and said bracket for resiliently urging said valve member to cover and close the end of said duct.

FREDERICK E. SMITH.